(12) United States Patent
Hartwich

(10) Patent No.: US 11,356,297 B2
(45) Date of Patent: Jun. 7, 2022

(54) USER STATION FOR A BUS SYSTEM AND METHOD FOR TRANSMITTING A MESSAGE AT DIFFERENT BIT RATES IN A BUS SYSTEM

(71) Applicant: Robert Bosch GmbH, Stuttgart (DE)

(72) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 16/966,725

(22) PCT Filed: Dec. 18, 2018

(86) PCT No.: PCT/EP2018/085635
§ 371 (c)(1),
(2) Date: Oct. 8, 2020

(87) PCT Pub. No.: WO2019/121769
PCT Pub. Date: Jun. 27, 2019

(65) Prior Publication Data
US 2021/0367810 A1  Nov. 25, 2021

(30) Foreign Application Priority Data
Dec. 22, 2017 (DE) ...................... 10 2017 223 775.9

(51) Int. Cl.
*H04L 12/54* (2022.01)
*H04L 12/40* (2006.01)

(52) U.S. Cl.
CPC .............. *H04L 12/56* (2013.01); *H04L 12/40* (2013.01); *H04L 2012/40215* (2013.01); *H04L 2012/40273* (2013.01)

(58) Field of Classification Search
CPC .......... H04J 3/0658; H04J 3/0614; H04J 3/06; H04J 3/16; H04J 3/07; H04L 12/4135;
(Continued)

(56) References Cited

U.S. PATENT DOCUMENTS 8,391,318 B2 * 3/2013 Hartwich .............. H04L 7/0331
370/294
9,740,655 B2 * 8/2017 Hartwich ............ G06F 13/4221
(Continued)

FOREIGN PATENT DOCUMENTS

| CN | 105409175 A | 3/2016 |
| CN | 105915311 A | 8/2016 |
| WO | 2016151353 A1 | 9/2016 |

OTHER PUBLICATIONS

International Search Report dated Mar. 14, 2019 in connection with PCT/EP2018/085635.
(Continued)

*Primary Examiner* — Man U Phan
(74) *Attorney, Agent, or Firm* — Norton Rose Fulbright US LLP; Gerard Messina

(57) ABSTRACT

A user station for a bus system and a method for transmitting a message at different bit rates in a bus system is provided. The user station includes a communication control unit for creating a message for at least one further user station of the bus system. The communication control unit is designed to provide in the message a first phase to be transmitted at a first bit rate, and to provide a second phase to be transmitted at a second bit rate, which is faster or slower than the first bit rate. The communication control unit is designed to provide in the message between the first and second phase a predetermined bit pattern for a bit rate switchover between the first and second bit rate. The predetermined bit pattern includes, both before and after the bit rate switchover, a flank for synchronization.

16 Claims, 3 Drawing Sheets

(58) Field of Classification Search
CPC . H04L 12/40; H04L 12/40032; H04L 1/0002; H04L 12/4013; H04L 12/40169; H04L 1/0083; H04L 12/413; H04L 12/46; H04L 12/423; H04L 25/02; H04L 29/08; G06F 13/4221; G06F 13/4068; G06F 1/24; G06F 1/32
USPC ........................................................ 370/401
See application file for complete search history.

(56) References Cited

U.S. PATENT DOCUMENTS

| | | | |
|---|---|---|---|
| 9,742,584 B2 * | 8/2017 | Hartwich | H04L 12/4013 |
| 9,819,589 B2 * | 11/2017 | Gach | H04L 12/40039 |
| 9,973,348 B2 * | 5/2018 | Mounier | G06F 13/4022 |
| 10,020,958 B2 * | 7/2018 | Lieder | H04L 12/40032 |
| 10,063,391 B2 * | 8/2018 | Walker | H04L 12/4135 |
| 10,164,792 B2 * | 12/2018 | Hehemann | H04L 25/028 |
| 10,218,452 B2 * | 2/2019 | Fredriksson | H04J 3/0658 |
| 10,341,165 B2 * | 7/2019 | Gehring | H04L 12/40 |
| 10,742,443 B2 * | 8/2020 | Beckmann | H04L 12/4013 |
| 10,924,198 B2 * | 2/2021 | Fredriksson | H04L 12/4135 |
| 2015/0339254 A1 | 11/2015 | Hartwich | |
| 2016/0254926 A1 | 9/2016 | Walker et al. | |

OTHER PUBLICATIONS

Florian Hartwich. "CAN with Flexible Data-Rate" Proceedings of the 13th international CAN Conference, Mar. 14, 2012, Retrieved from the Internet on Oct. 8, 2020: https://www.can-cia.org/fileadmin/resources/documents/proceedings/2012_hartwich.pdf. 9 Pages.

* cited by examiner

USER STATION FOR A BUS SYSTEM AND METHOD FOR TRANSMITTING A MESSAGE AT DIFFERENT BIT RATES IN A BUS SYSTEM

FIELD

The present invention relates to a user station for a bus system and to a method for transmitting a message at different bit rates in a bus system.

BACKGROUND INFORMATION

A bus system, in which data are transmitted as messages in the Standard ISO11898-1:2015 as CAN protocol specification with CAN FD, is used for the communication between sensors and control units. The messages are transmitted between the bus users of the bus system such as a sensor, control unit, transmitter, etc.

In a classic CAN message format, the bit rate is limited in that a bit arbitration at the beginning of the frame or of a message and the acknowledgement at the end of a frame or of a message is possible only if the bit time is significantly more than twice as long as the signal propagation time between arbitrary bus users. In the arbitration, it is determined which of the bus users next has an exclusive access to the bus of the bus system for a predetermined time. With the acknowledge, it is communicated whether or not a receiver has discovered an error in the received frame or message.

In order to be able nevertheless to transmit data at higher bit rates, an option has been created in the CAN FD messages format for switching over to a higher bit rate within a message. In such technologies, the maximum possible data rate is increased beyond a value of 1 Mbit/s by using a higher clocking in the area of the data fields. Such messages are also referred to below as CAN FD frames or CAN FD messages. In CAN FD, the payload data length is extended from 8 to up to 64 byes and the data transmission rates are significantly higher than in CAN.

The switchover within a message in the FD frame format or FD message format to a higher bit rate and back takes place between the end of the arbitration and before the acknowledge, as defined in the aforementioned CAN protocol (ISO 11898-1:2015). In this area, the lower limit for the bit time is no longer determined by the signal propagation times, however, the bit time must still provide sufficient reserves for potential asymmetries in the analog signal transmission and for phase shifts between the bus users caused by clock tolerances.

These phase shifts are compensated for in the CAN frame by regular synchronizations at flanks from the recessive to the dominant bus level. A distinction is made here between a hard synchronization and a resynchronization.

In the classic CAN frame, the hard synchronization takes place only once at the beginning of the frame or message. In this case, a potential phase error except for a residual of maximally one time quantum is compensated for. The time quantum is the time unit of the CAN protocol. During resynchronization, a residual error remains if the phase error is greater than the configured synchronization jump width SJW. The synchronization jump width must therefore be as large as the phase error accumulated between two synchronizations may become. At a clock tolerance of df, the maximum clock difference between transmitter and receiver is 2*df. This means, the phase error between the two bus users may accumulate in 10 bit times (in the maximum interval between two resynchronizations) at, for example, df=1% to 20% of a bit time.

The change from the slow to the faster bit rate in the CAN FD message takes place in two stages. During the arbitration, other synchronization rules apply, so that a bus user that loses the arbitration only with the last bits of the identifier, is potentially not sufficiently synchronized with the remaining transmitter.

Thus, all receivers are synchronized with the transmitter of the message with the aid of a hard synchronization at the flank from the recessive FDF bit of the CAN FD message to the following dominant reserved bit of the CAN FD message. This is followed by the BRS bit, whose level decides whether the bit rate is switched over. The switchover point in time is at the sample point of this bit.

The method described requires that the clocks and configuration adjustments of all bus users are synchronized with one another to such an extent that the sample point of all bus users is at the same position within the bit time. The hard synchronization at the end of the FDF bit limits the deviations of the switchover point in time between the bus users to the residual error after the hard synchronization. In relation to the bit time, this phase error becomes more serious after the change to the higher bit rate with the then shorter bit time. The first resynchronization after the switch takes place in the ESI bit or in the data length code, depending on the transmitted values. A deviant adjustment of the sample point position at a bus user would increase the phase error at the switchover point in time and leave fewer reserves remaining to compensate for clock tolerances.

In the switchover from the faster bit rate back to the slower bit rate, the forwarded phase error becomes less important with regard to the then longer bit time. Thus, this change is more robust than the switchover from the slower bit rate to the faster bit rate.

SUMMARY

It is an object of the present invention to provide a user station for a bus system and a method for transmitting a message at different bit rates in a bus system, which solve the aforementioned problems. In accordance with an example embodiment of the present invention, a user station for a bus system and a method for transmitting a message at different bit rates in a bus system, in particular, are to be provided, in which a greater robustness of the bit rate switchover and an increase of the bit rate in the data field may be implemented.

The object may be achieved by a user station for a bus system in accordance with an example embodiment of the present invention. The example user station includes a communication control unit for creating a message for at least one further user station of the bus system, in which an exclusive, collision-free access of a user station to a bus line of the bus system is at least temporarily ensured, the communication control unit being designed to provide in the message a first phase, to be transmitted at a first bit rate, and to provide a second phase, to be transmitted at a second bit rate, which is faster or slower than the first bit rate, the communication control unit being designed to provide in the message between the first and second phase a predetermined bit pattern for a bit rate switchover between the first and second bit rate, and the predetermined bit rate including a flank for the synchronization both before as well as after the bit rate switchover, with the aid of which that at least one further user station as a receiver may synchronize with the user station as a transmitter.

In accordance with an example embodiment of the present invention, the communication control unit of the user station may also be designed in such a way that the user station as receiver of a message synchronizes with the transmitting user station if the received message between the first and second phase contains a predetermined bit pattern for a bit rate switchover between the first and second bit rate, the predetermined bit pattern including a flank for the synchronization both before as well as after the bit rate switchover.

With the user station, a bit rate switchover is possible, in which a synchronization takes place before and after the switchover point in time. With the used, fixed bit patterns at the switchover points in time, a better synchronization of the user station with other bus users in a bus system is implementable before the variable payload data are transmitted.

The synchronization functions well, in particular, if a hard synchronization takes place at both synchronization flanks, such as for example, in the aforementioned specification of the CAN FD protocol specified for the flank of FDF for the reserved bit.

The multiple synchronization before and after the switchover point in time permits greater clock tolerances and greater latitude in the configuration adjustments.

In addition, the method carried out by the user station provides a greater robustness of the bit rate switchover and an increase of the bit rate in the data field.

The method carried out by the user station may be subsequently incorporated into the CAN FD protocol. For example, the incorporation is also possible as an option, which may be optionally integrated.

Advantageous further embodiments of the user station are described herein.

According to one specific embodiment variant of the present invention, at least the flank after the bit rate switchover is a flank for hard synchronization.

According to one further specific embodiment variant of the present invention, the flank before and after the bit rate switchover is a flank for resynchronization.

In one exemplary embodiment of the present invention, the flanks for synchronization may be flanks from recessive to dominant, so that the predetermined bit pattern is 1010 if recessive is =1 and dominant is =0.

According to one further exemplary embodiment of the present invention, the communication control unit may be designed to provide a switchover bit U in the message, whose value decides whether the first bit rate is to be switched over to the second bit rate, the second bit rate being faster than the first bit rate. In this case, the predetermined bit rate may be 10U10 if recessive is =1 and dominant is =0. Alternatively, the communication control unit may be designed to set switchover bit U to recessive or 1 in order to signal that a switchover is to take place in the message from the first bit rate to the second bit rate, and to set the predetermined bit pattern as 10U0 if recessive is =1 and dominant is =0.

It is possible that the message is a CAN FD message, in which the predetermined bit pattern encompasses a switchover of the first bit rate after an arbitration phase to a faster second bit rate in the data phase, in which payload data of the message are encompassed, and/or in which the predetermined bit pattern encompasses a switchover of the second bit rate after an acknowledgment to the slower first bit rate for the arbitration phase.

The predetermined bit pattern possibly includes the BRS bit of a CAN FD message as a switchover bit between the first and second bit rate.

The above-described user station may also include a transceiver device for synchronization on a flank in the predetermined bit pattern of a message at the end or beginning of an arbitration phase. In this case, the transceiver device is possibly designed to transmit the data at the second bit rate at a bus level on the bus line different from that of the data at the first bit rate.

The above-described user station may be part of a bus system, which also includes a parallel bus line and at least two user stations, which are interconnected via the bus line in such a way that they are able to communicate with one another. In this case, at least one of the at least two user stations is an above-described user station.

The aforementioned object may also be achieved by a method for transmitting a message at different bit rates in a bus system according an example embodiment of the present invention. In an example embodiment of the present invention, the method has the steps: creating, using a communication control unit of a user station of the bus system, a message for at least one further user station of the bus system, in which an exclusive, collision-free access of a user station to a bus line of the bus system is at least temporarily ensured, the communication control unit providing in the message a first phase to be transmitted at a first bit rate, and providing a second phase to be transmitted at a second bit rate, which is faster or slower than the first bit rate, the communication control unit providing in the message between the first and second phase a predetermined bit pattern for a bit rate switchover between the first and second bit rate, and the predetermined bit pattern including both before and after the bit rate switchover a flank for synchronization, with the aid of which the at least one further user station as receiver is able to synchronize with the user station as transmitter.

The method yields the same advantages as described above with respect to the user station.

Further possible implementations of the present invention also include combinations not explicitly mentioned of features and specific embodiments described above or below with respect to the exemplary embodiments. In this case, those skilled in the art will also add individual aspects as improvements on or additions to the respective basic form of the present invention, in view of the disclosure herein.

BRIEF DESCRIPTION OF THE DRAWINGS

The present invention is described in greater detail below with reference to the figures and based on exemplary embodiments.

In the figures, identical or functionally identical elements are provided with the same reference numeral unless otherwise indicated.

DETAILED DESCRIPTION OF EXAMPLE EMBODIMENTS

Figure 1:
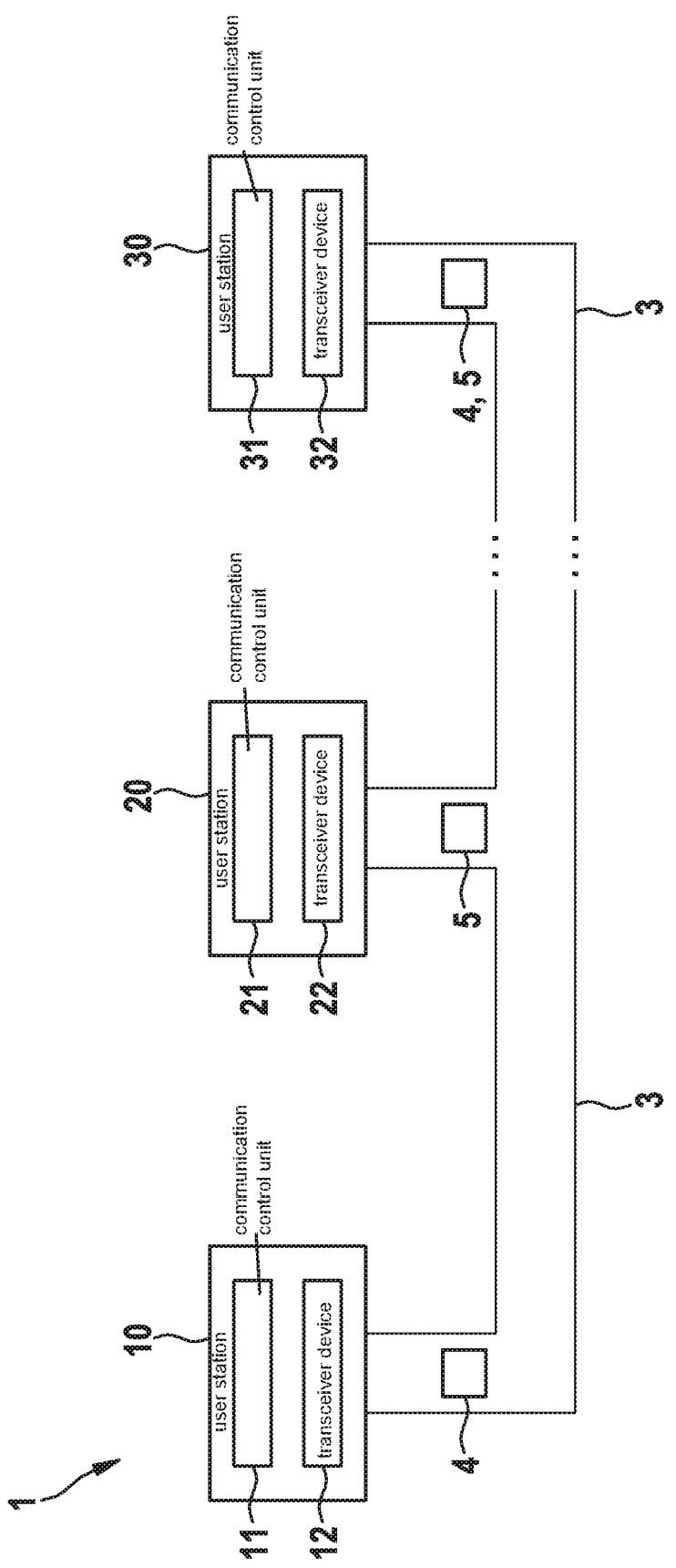
FIG. 1 shows a simplified block diagram of a bus system according to one first exemplary embodiment of the present invention.

FIG. 1 shows by way of example, a bus system 1, which is designed, in particular, for a CAN bus system, a CAN FD bus system, etc. Bus system 1 may be used in a vehicle, in particular, in a motor vehicle, in an aircraft etc., or in a hospital etc.

Bus system 1 in FIG. 1 has an, in particular, parallel bus line 3, to which a plurality of user stations 10, 20, 30 are connected. Messages 4, 5 in the form of signals are transmittable serially via bus line 3 between individual user stations 10, 20, 30. User stations 10, 20, 30 are, for example, control units, sensors, display devices, etc., of a motor vehicle.

As shown in FIG. 1, user station 10 has a communication control unit 11 and a transceiver device 12. In contrast, user station 20 has a communication control unit 21 and a transceiver device 22. User station 30 has a communication control unit 31 and a transceiver device 32. Transceiver devices 12, 22, 32 of user stations 10, 20, 30 are each directly connected to bus line 3, even though this is not illustrated in FIG. 1.

Communication control unit 11, 21, 31 each serve to control a communication of respective user station 10, 20, 30 via bus line 3 with a different user station of user stations 10, 20, 30, which are connected to bus line 3.

Communication control unit 11 may be designed as a conventional CAN controller. Communication control unit 11 creates and reads first messages 4, for example, classic CAN messages 4. Classic CAN messages 4 are structured according to the classic basic format, in which a number of up to 8 data bytes may be encompassed in message 4, as shown in the upper part of FIG. 2.

Communication control unit 21 in FIG. 1 may be designed as a conventional CAN FD controller except for the differences described in still greater detail below. Communication control unit 21 creates and reads second messages 5, which are modified CAN FD messages 5, for example. In this case, modified CAN FD messages 5 are structured on the basis of a CAN FD format, in which a number of up to, for example, 64 data bytes may be encompassed in message 5, as is shown in the lower part of FIG. 2.

Communication control unit 31 may be designed in order, as needed, to provide for or to receive from transceiver device 32 a classic CAN message 4 or a modified CAN FD message 5. Thus, communication control unit 21 creates and reads a first message 4 or second message 5, first and second message 4, 5 differing in terms of their data transmission standard, namely in this case CAN or modified CAN FD.

Transceiver device 12 may be designed as a conventional CAN transceiver. Transceiver device 22 may be designed as a conventional CAN FD transceiver except for the differences described in still greater detail below. Transceiver device 32 may be designed in order, as needed, to provide for or to receive from communication control unit 31 messages 4 according to the present CAN base format or messages 5 according to the modified CAN FD format.

A formation and then transmission of messages 5 with the modified CAN FD or also at data rates higher than CAN FD may be implemented with the two user stations 20, 30.

Figure 2:
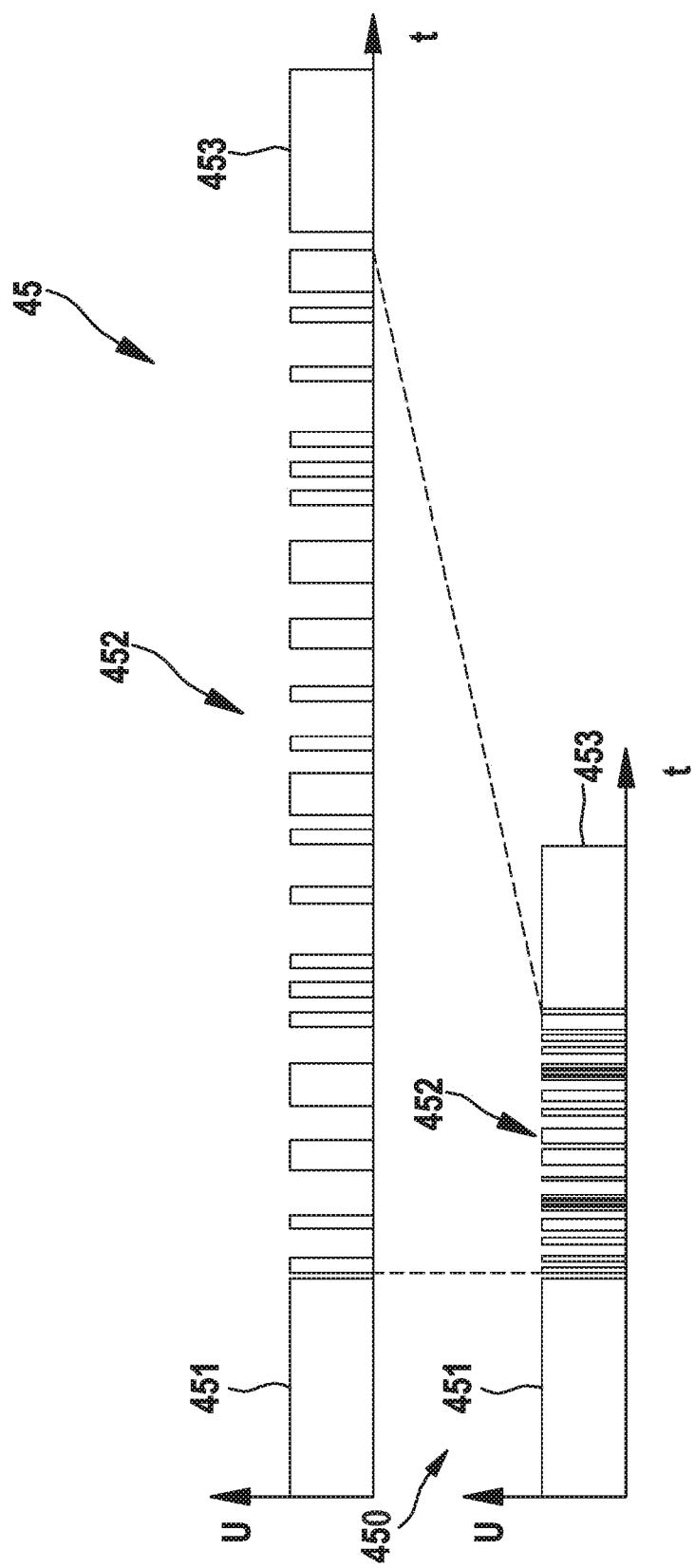
FIG. 2 shows a diagram for illustrating the structure of messages, which may be transmitted by user stations of the bus system according to the first exemplary embodiment of the present invention.

The upper part of FIG. 2 shows for message 4 a CAN frame 45 as it is transmitted by transceiver device 12 or by transceiver device 13, and in its lower part for message 5 a CAN FD frame 450 as it may be transmitted by transceiver device 22 or 32. CAN frame 45 and CAN FD frame 450 are subdivided basically into two different phases or areas for the CAN communication on bus 40, namely arbitration phases 451, 453 and a data area 452, which is also referred to as a data field in classic or classic CAN or also as data phase 452 in CAN FD. The payload data of the CAN FD frame or of message 5 are contained in data phase 452.

According to FIG. 2, the bit rate for following data phase 452 is increased, for example, to 2, 4, 8 Mbps at the end of arbitration phase 451 in CAN FD as compared to the classic CAN. This means that in CAN FD, the bit rate in arbitration phases 451, 453 is lower than the bit rate in data phase 452. In CAN FD, data phase 452 is temporally significantly reduced compared to data phase 452 of the CAN frame.

Figure 3:
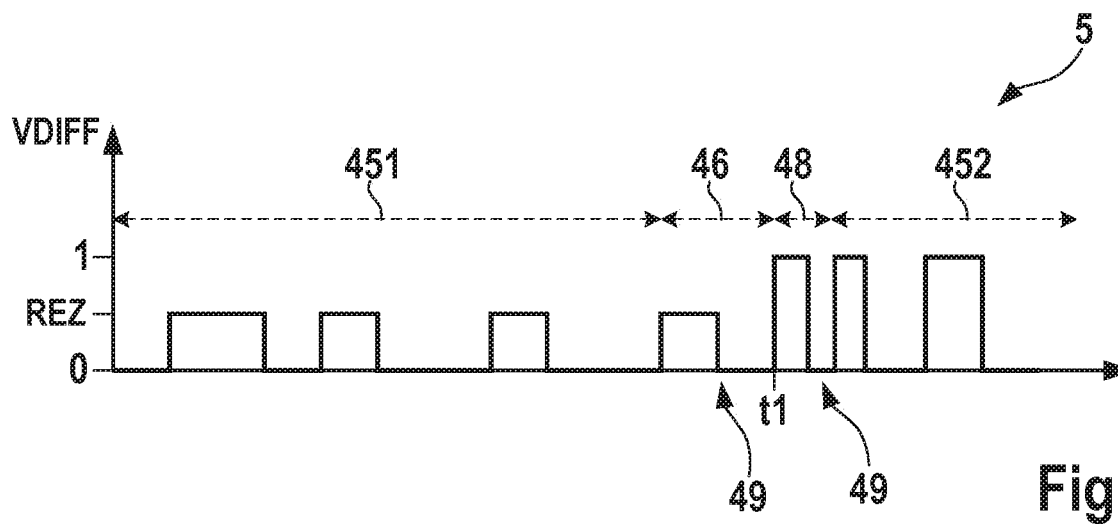
FIG. 3 shows a representation of an example of a temporal profile of a differential voltage VDIFF of bus signals CAN_H, CAN_L for a part of the message in a transceiver device of the bus system according to the first exemplary embodiment of the present invention.

FIG. 3 shows more exactly the transition between arbitration phase 451 and data phase 452 for message 5 based on differential voltage VDIFF for differential signals CAN-H and CAN_L over time t. A switchover takes place in the transition between a first and second bit rate. In this case, a predetermined bit pattern including the bit sequences 46, 48 is provided between arbitration phase 451 and data phase 452.

According to FIG. 3, a slower bit rate is used in arbitration phase 451, which is also referred to below as the first bit rate. In this case, the level of logic '0' is dominant and may overwrite the recessive level with which logic '1' is transmitted. In synchronizing bit pattern 46, 48 there is a first synchronization flank 49 in a bit sequence 46 immediately before the bit rate switchover at a switchover point in time t1. A second synchronization flank 49 in a bit sequence 48 comes immediately after the switchover. Besides the bit rate, the bus levels of differential voltage VDIFF may optionally also be switched here from a first level 'REZ' to a second level '1', for example, in order to enable more symmetrical bit lengths at the higher bit rate. The higher or faster bit rate is also referred to below as the second bit rate. The switchover of the bus level may also take place as needed in another manner as specified in the CAN protocol.

Of flanks 49 before and after the bit rate switchover, it is possible to use at least one of the flanks for hard synchronization. It is possible, however, that both flanks 49 are used for resynchronization.

Bit sequence 46 and bit sequence 48 form one part of a frame format, in which the bit rate switchover takes place within fixed or predetermined bit pattern 46, 48, which includes one flank 49 each for the synchronization immediately before and after the switchover at switchover point in time t1. In the example of FIG. 3, the predetermined bit pattern is "1010". As a result, individual user stations 20, 30 synchronize themselves with the flanks from recessive '1' to dominant '0'. Predetermined bit pattern 46, 48 of FIG. 3 is the simplest bit pattern, which enables two synchronizations in succession at a transition between the first and the second bit rate of, for example, arbitration phase 451 and data phase 452.

As shown in FIG. 3, the configuration for the low bit rate is still used at the first 1→0 flank, at the second flank 1→0, however, already the configuration for the high bit rate is used.

Without bit rates switchover, the second synchronization is not necessary.

The same predetermined bit pattern 46, 48 including bit sequences 46 and 48 may also be used in order to switch back at the end of message 5 better synchronized with the slower bit rate, for example, before a possible acknowledgement of other bus users 20, 30 in a CAN FD frame 450, i.e., at the end of data phase 452. With the acknowledgement, it is communicated whether or not a receiver has discovered an error in the received frame or message 5.

Synchronizing bit pattern 46, 48 is particularly helpful if, besides the bit rate, the so-called "physical layer" is also switched over, i.e., if a bus level different from that used for the transmission of the lower bit rate is used for the transmission of the higher bit rate, as illustrated in FIG. 3.

Figure 4:
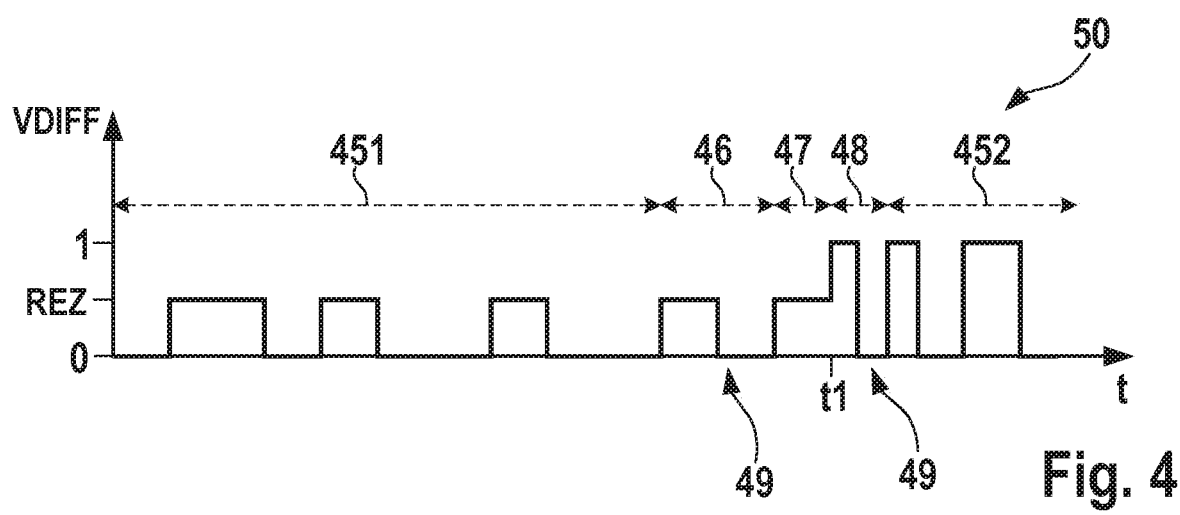
FIG. 4 shows a representation of an example of a temporal profile of a differential voltage VDIFF of bus signals CAN_H and CAN_L for a part of a message in a transceiver device of a bus system according to one second exemplary embodiment of the present invention.

FIG. 4 shows with respect to one second exemplary embodiment the transition between arbitration phase 451 and data phase 452 for a message 50. Here, too, differential voltage VDIFF for differential signals CAN_H and CAN_L is again shown over time t for a part of message 50, in which a switchover of the bit rate takes place, as described above with respect to FIG. 3.

In contrast to predetermined bit pattern 46, 48 including bit sequences 46 and 48 of FIG. 3, a predetermined bit pattern 46, 47, 48 including bit sequences 46 and 47 and 48, is provided in message 50 between arbitration phase 451 and data phase 452.

Bit sequence 47 corresponds to a switchover bit U, whose value decides whether or not the bit rate is to be switched over. Thus, in the example of FIG. 4, the predetermined bit pattern "10U10" yields bit sequence 46, 47, 48.

In a CAN FD frame, switchover bit 'U' corresponds to the BRS bit in the CAN FD message format. The fact that the CAN FD protocol according to the ISO 11898-1:2015 includes the option of switching the CAN FD controller into a protocol exception state if the reserved bit following the FDF bit is seen as recessive and not, as expected, dominant, may be useful in this case. This option is to allow a new frame format or message format to be introduced, which is not destroyed with error frames by "old" or already existing CAN FD controllers not yet familiar with this format.

One embodiment variant of the present invention utilizes the fact that the ESI bit in the CAN FD frame or message 5 is presently usually dominant. Bit pattern FD-res-BRS ESI as "1010" therefore provides two good synchronization flanks 49 in the CAN FD frame or message 5. In the event the ESI bit is recessive, the result is a bit pattern of "1011111o" together with a DLC="1111", "o" being a dominant stuff bit. Here, second synchronization flank 49 comes late.

In the event the "res" bit or "reserved bit" is selected to be recessive and two dominant synchronization bits are inserted, this results in the bit pattern FDF-res-sync-BRS-sync-(ESI=?)="11010?", "?" being a placeholder for a freely selectable bit state.

Even though the cited variants are very advantageous, other embodiment variants are of course also possible.

As also in the example of FIG. 3, the same predetermined bit pattern 46, 47, 48 including bit sequences 46 and 47 and 48 may also be used in order to switch back at the end of message 50 better synchronized with the slower bit rate, for example, before a possible acknowledgement of other bus users. A switchover bit 'U' is unnecessary in this case.

In addition or alternatively, the synchronizing bit pattern in the format of message 5 may be omitted in messages 5, in which it has been decided by switchover bit 'U' at the first bit rate-switchover-bit pattern that the bit rate in this message 5 has not been switched over.

Otherwise, the same applies as described above in conjunction with FIG. 3.

Figure 5:
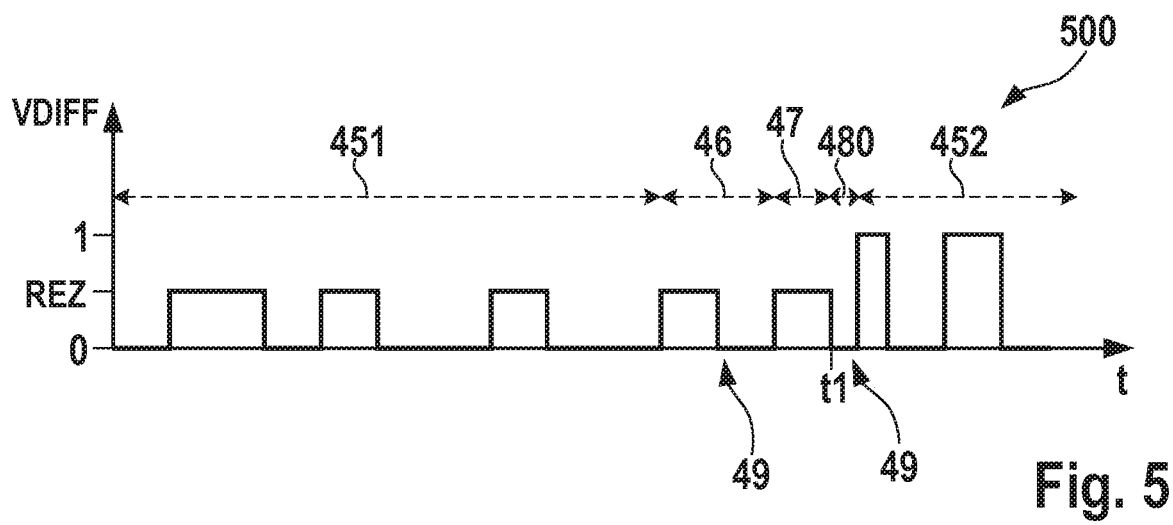
FIG. 5 shows a representation of an example of a temporal profile of a differential voltage VDIFF of bus signals CAN_H and CAN_L for a part of a message in a transceiver device of a bus system according to one third exemplary embodiment of the present invention.

FIG. 5 shows with respect to one third exemplary embodiment of the present invention, the transition between arbitration phase 451 and data phase 452 for a message 500. As already described above with respect to FIG. 4, here, too, differential voltage VDIFF for differential signals CAN_H and CAN_L over time t is again shown for a part of message 500, in which a switchover of the bit rate takes place.

In message 500, it is established, for example, that value '1' for the switchover bit U of the second exemplary embodiment means that the bit rate is to be switched over. Thus, predetermined bit pattern 46, 47, 48, which has the value "10U10" for bit sequence 46 and 47 and 48 in FIG. 4, is shortened in message 500 into bit pattern 46, 47, 480 and thus to "10U0".

On the whole, it is possible with the above-described exemplary embodiments to yield a very high clock tolerance and latitude in the configuration adjustments for bus system 1.

The above-described embodiments of bus system 1, of user stations 10, 20, 30 and of the method carried out by the latter may be used individually or in all possible combinations. All features of the above-described exemplary embodiments and/or their embodiment variants and/or their modifications may, in particular, be arbitrarily combined. In addition or alternatively, the following modifications, in particular, are possible.

The above-described bus system 1 according to the exemplary embodiments is described with reference to a bus system based on the CAN protocol. Bus system 1 according to the exemplary embodiments may, however, also be another type of serial communication network. It is advantageous, but not a necessary precondition, that in bus system 1 an exclusive collision-free access of a user station 10, 20, 30 to a shared channel is ensured at least for particular time spans.

The number and configuration of user stations 10, 20, 30 in bus system 1 of the exemplary embodiments is arbitrary. User station 10, in particular, may be omitted in bus system 1. It is possible that one or multiple of user stations 10 or 20 or 30 are present in bus system 1.

What is claimed is:

1. A user station for a bus system, comprising:
a communication control unit configured to create a message for at least one further user station of the bus system, in which an exclusive, collision-free user station access to a bus line of the bus system is at least temporarily ensured, wherein the message, which the communication control unit is configured to create, includes:
a first phase for arbitration to be transmitted at a first bit rate;
a second phase including a data payload to be transmitted at a second bit rate, which is faster or slower than the first bit rate; and
between the first phase and the second phase, a predetermined bit pattern for a bit rate switchover between the first bit rate and the second bit rate, wherein, within the predetermined bit pattern, there is a first synchronization flank before the bit rate switchover and a second synchronization flank after the bit rate switchover, each of the first and second synchronization flanks included in the predetermined bit pattern between the first and second phases being usable by the at least one further user station as receiver to synchronize with the user station as transmitter.

2. The user station as recited in claim 1, wherein the user station, as receiver of a second message, is synchronized with a transmitting user station when the received second message contains the predetermined bit pattern between the first phase and the second phase, for a bit rate switchover between the first and second bit rate, the predetermined bit pattern including, both before and after the bit rate switchover, a flank for synchronization.

3. The user station as recited in claim 1, wherein at least the flank after the bit rate switchover is a flank for hard synchronization.

4. The user station as recited in claim 1, wherein the flanks for synchronization are flanks from recessive to dominant, so that the predetermined bit pattern is 1010, when recessive is 1 and dominant is 0.

5. The user station as recited in claim 1, wherein the communication control unit is configured to provide, in the message, a switchover bit (U) whose value decides whether the first bit rate is to be switched over to the second bit rate, and the second bit rate being faster than the first bit rate.

6. The user station as recited in claim 5, wherein the predetermined bit pattern is 10U10 and wherein recessive is 1 and dominant is 0.

7. A user station for a bus system, the user station comprising:
 a communication control unit configured to:
  create a message for at least one further user station of bus system, in which an exclusive, collision-free user station access to a bus line of the bus system is at least temporarily ensured; and
  provide in the message:
   a first phase to be transmitted at a first bit rate;
   a second phase to be transmitted at a second bit rate, which is faster than the first bit rate; and
   between the first phase and the second phase, a predetermined bit pattern for a bit rate switchover between the first bit rate and the second bit rate, the predetermined bit pattern including, both before and after the bit rate switchover, a flank for synchronization, using which the at least one further user station as receiver is able to synchronize with the user station as transmitter, the bit pattern including a switchover bit (U) whose value decides whether the first bit rate is to be switched over to the second bit rate; and
  set the switchover bit U to recessive or 1, to signal that in the message, a switchover is to take place from the first bit rate to the second bit rate, and to set the predetermined bit pattern as 10U0, wherein recessive is 1 and dominant is 0.

8. A user station for a bus system, the user station comprising:
 a communication control unit configured to:
  create a message for at least one further user station of bus system, in which an exclusive, collision-free user station access to a bus line of the bus system is at least temporarily ensured; and
  provide, in the message:
   a first phase to be transmitted at a first bit rate;
   a second phase to be transmitted at a second bit rate, which is faster or slower than the first bit rate; and
   between the first phase and the second phase, a predetermined bit pattern for a bit rate switchover between the first bit rate and the second bit rate;
 wherein:
  the predetermined bit pattern includes, both before and after the bit rate switchover, a flank for synchronization, using which the at least one further user station as receiver is able to synchronize with the user station as transmitter; and
  the message is a Controller Area Network Flexible Data Rate (CAN FD) message, in which the predetermined bit pattern includes a switchover of the first bit rate after an arbitration phase to a faster second bit rate in the data phase, in which payload data of the message are encompassed, and/or in which the predetermined bit pattern includes a switchover of the second bit rate after an acknowledgment to a slower first bit rate for the arbitration phase.

9. The user station as recited in claim 8, wherein the predetermined bit pattern includes a Bit Rate Switch (BRS) bit of a CAN FD message as a switchover bit between the first bit rate and the second bit rate.

10. The user station as recited in claim 1, further comprising:
 a transceiver device configure to synchronize with one of the flanks in the predetermined bit pattern of a further message at an end or beginning of an arbitration phase.

11. The user station as recited in claim 10, wherein the transceiver device is configured to transmit data at the second bit rate at a bus level on the bus line differing from that of data at the first bit rate.

12. A bus system, comprising:
 a parallel bus line; and
 at least two user stations which are interconnected via the bus line in such a way that they are able to communicate with one another, wherein at least one of the at least two user stations is a user station including a communication control unit configured to create a message for at least one further one of the user stations of the bus system, in which an exclusive, collision-free user station access to a bus line of the bus system is at least temporarily ensured, wherein the message, which the communication control unit is configured to create, includes:
  a first phase for arbitration to be transmitted at a first bit rate;
  a second phase including a data payload to be transmitted at a second bit rate, which is faster or slower than the first bit rate; and
  between the first phase and the second phase, a predetermined bit pattern for a bit rate switchover between the first rate and the second bit rate, wherein, within the predetermined bit pattern, there is a first synchronization flank before the bit rate switchover and a second synchronization flank after the bit rate switchover, each of the first and second synchronization flanks included in the predetermined bit pattern between the first and second phases being usable by the at least one further user station as receiver to synchronize with the user station as transmitter.

13. A method for transmitting a message at different bit rates in a bus system, the method comprising:
 creating, using a communication control unit of a user station of the bus system, a message for at least one further user station of the bus system, in which an exclusive, collision-free user station access to a bus line of the bus system is at least temporarily ensured, wherein the message, which the communication control unit creates, includes:
a first phase for arbitration to be transmitted at a first bit rate;
a second phase including a data payload to be transmitted at a second bit rate, which is faster or slower than the first bit rate; and
between the first phase and the second phase, a predetermined bit pattern for a bit rate switchover between the first and second bit rate, wherein, within the predetermined bit pattern, there is a first synchronization flank before the bit rate switchover and a second synchronization flank after the bit rate switchover, each of the first and second synchronization flanks included in the predetermined bit pattern between the first and second phases being usable by the at least one further user station as receiver to synchronize with the user station as transmitter.

14. The user station as recited in claim 8, wherein the predetermined bit pattern includes the switchover of the first bit rate after the arbitration phase to the faster second bit rate in the data phase, in which the payload data of the message are encompassed.

15. The user station as recited in claim 8, wherein the predetermined bit pattern includes the switchover of the second bit rate after the acknowledgment to the slower first bit rate for the arbitration phase.

16. The user station as recited in claim 8, wherein the predetermined bit pattern includes both (a) the switchover of the first bit rate after the arbitration phase to the faster second bit rate in the data phase, in which the payload data of the message are encompassed and (b) the switchover of the second bit rate after the acknowledgment to the slower first bit rate for the arbitration phase.

* * * * *